Feb. 20, 1968     R. B. DOWNEY     3,369,469

PHOTOGRAPHIC APPARATUS

Filed Dec. 27, 1965     4 Sheets-Sheet 1

INVENTOR.
Roger B. Downey
BY Brown and Mikulka
ATTORNEYS

Feb. 20, 1968  R. B. DOWNEY  3,369,469
PHOTOGRAPHIC APPARATUS
Filed Dec. 27, 1965  4 Sheets-Sheet 2
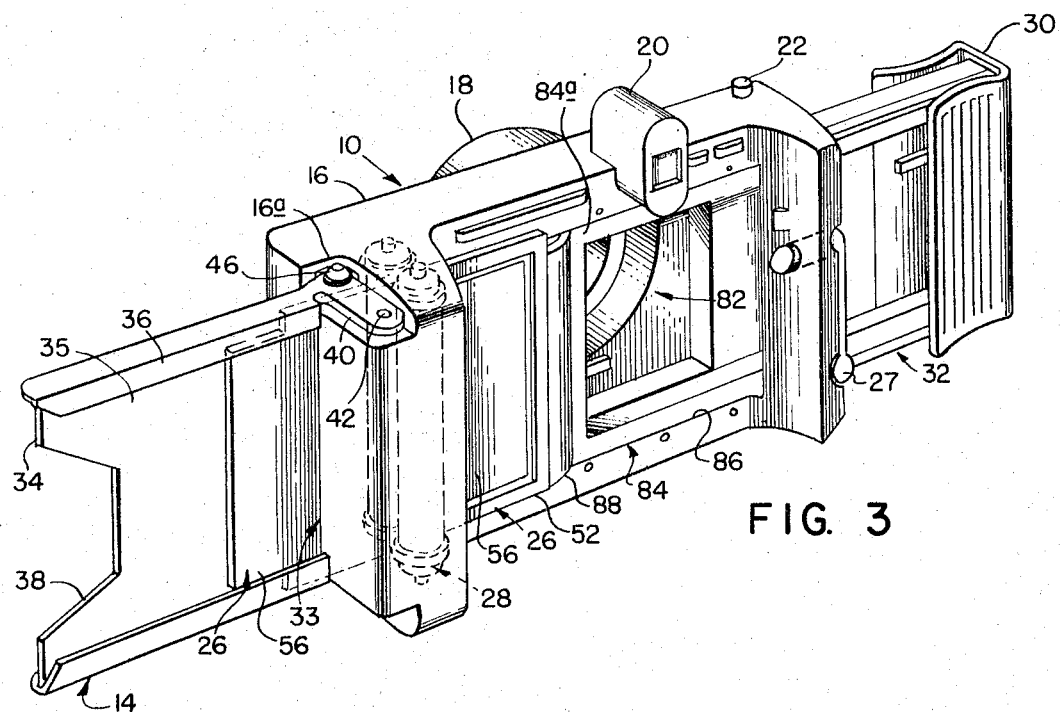
FIG. 3
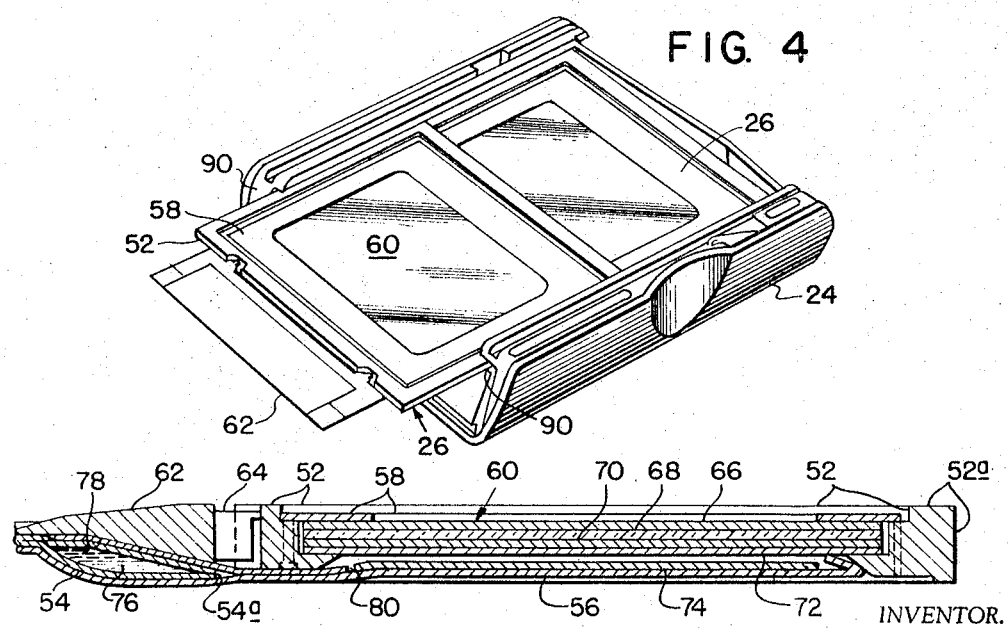
FIG. 4
FIG. 7
INVENTOR.
Rogers B. Downey
BY
Brown and Mikulka
ATTORNEYS Feb. 20, 1968  R. B. DOWNEY  3,369,469
PHOTOGRAPHIC APPARATUS
Filed Dec. 27, 1965  4 Sheets-Sheet 4

INVENTOR.
Rogers B. Downey
BY
Brown and Mikulka
ATTORNEYS

United States Patent Office 3,369,469
Patented Feb. 20, 1968

3,369,469
PHOTOGRAPHIC APPARATUS
Rogers B. Downey, Lexington, Mass., assignor to Polaroid Corporation, Cambridge, Mass., a corporation of Delaware
Filed Dec. 27, 1965, Ser. No. 516,415
16 Claims. (Cl. 95—13)

This invention relates to novel processing means adapted to incorporation with a miniature camera for completing the processing and final physical form of a film assembly which, immediately beforehand, has been exposed and subjected to initial processing treatment in the camera.

The processing means or apparatus of the present invention, when employed with complementary processing means of the camera and with a given type of film assembly adapted to a diffusion transfer method of image formation, is capable of producing finished, high-quality photographic prints. It is especially adapted to provide completely mounted transparencies of a miniature format, either in black-and-white or in full color, the latter being a particular objective. Upon its removal from the processing means of the invention, the transparency is in a condition suitable for direct viewing or projection.

A film assembly of a type adapted to use with the apparatus of the present invention includes a releasably-carried processing liquid. Such a film assembly is more fully described in the copending U.S. patent application Ser. No. 516,494, filed Dec. 27, 1965. The film assembly is of a multilayered construction such that, after exposure of a photosensitive silver halide emulsion, release and spreading of the liquid takes place by the application of a compressive force to a liquid-containing component and to adjacent liquid-confining layers thereof. This is followed by imbibition of the liquid into predetermined layers, including the exposed emulsion, and stripping of the no-longer-needed emulsion and other used-up portions, whereby portions bearing the image remain and are rendered visible. Apparatus of the present invention is principally concerned with facilitating the performance of those stages of the image-forming process which involve the aforesaid imbibition of the released and spread processing liquid and separation or stripping from image-carrying and other portions of the film assembly of the emulsion and other superfluous remnants, namely, the exhausted liquid container and the liquid confining layers, all of which have completed their function.

As above intimated, the photographic image is produced by development of a latent image and the transfer of image-forming substances to a designated image-receiving surface. Processing is initiated by moving the film assembly between compressive means within the camera. This is accomplished by a film-assembly transport mechanism, operative according to a predetermined program. The compressive means and coacting transport mechanism constitute the aforesaid complementary processing means and are described in greater detail in the copending U.S. patent application Ser. No. 516,416, filed Dec. 27, 1965.

A processing liquid suitable for use in forming the image may, for example, comprise an aqueous solution of a silver halide developer such as hydroquinone, a silver halide solvent of the type of sodium thiosulfate, and an alkaline substance such as sodium hydroxide. It may also include a thickening or film-forming agent such as a synthetic polymer of the type of sodium carboxymethyl cellulose and, possibly, a high-molecular-weight polymeric mordant to facilitate the diffusion transfer process. In producing a black-and-white transparency, a latent image is developed; the exposed silver halide is reduced to silver, and the unreduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. One preferred color process involves the formation of a black-and-white image in conjunction with a color screen, the latter being employed both in a taking and viewing capacity as the color-providing instrumentality. Methods and film materials for producing black-and-white or multicolored images, of categories which may be regarded as relating to those contemplated herein, are described in U.S. Patents Nos. 2,543,181, 2,614,926, 2,707,150, 2,726,154, 2,944,894, 2,968,554, 2,983,606 and 3,087,815.

Objects of the present invention are to provide processing means or apparatus of the character described adapted to incorporation with a camera wherein is included complementary processing means; to provide such processing means wherein the camera is of a miniature type; to provide processing means of the type characterized which in large part is located exteriorly of the camera and which is movable either to operational or carrying position thereby contributing to a desirable compactness of the camera not otherwise possible; to provide processing apparatus of the aforesaid category which is alternatively pivotable to an extended functional position or to a folded carrying position; to provide processing apparatus, as described, which facilitates stripping of superfluous waste portions from the processed film assembly and easier removal of the assembly for direct viewing or projection purposes; to provide processing means of the type stated which protects the film assembly during the processing period against exposure to damaging actinic light; to provide processing means of the character described which incorporates interlocking mechanism actuating means within the camera to prevent processing of a film assembly excepting when the processing of the invention is at a position for effecting a correct processing thereof; to provide processing means of the character stated which embodies a semi-enclosing film-assembly receiving chamber or receptacle one side of which is open and the other side closed; and to provide processing means of the category described which is of a relatively simple and inexpensive yet rugged construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a diagrammatic perspective view of the camera with a film magazine removed to illustrate the cooperative role of the processing means of the invention with cooperating complementary processing means of the camera, with the receiving chamber at open position;

FIG. 4 is a diagrammatic perspective view of a film magazine for use with a camera embodying the processing means of the invention;

FIG. 7 is a diagrammatic cross-sectional side view of the film assembly;

Figure 11:
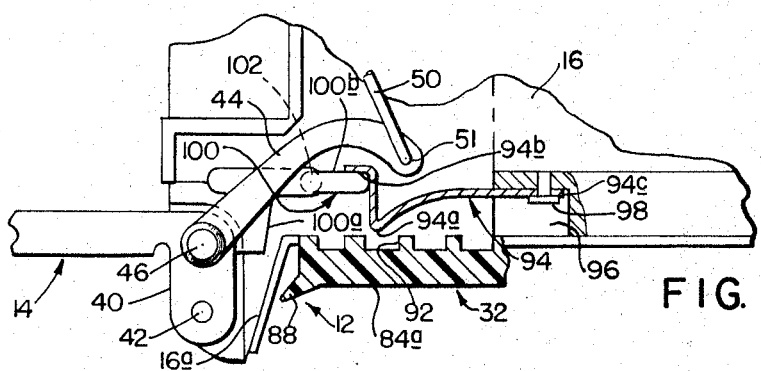
Figure 12:
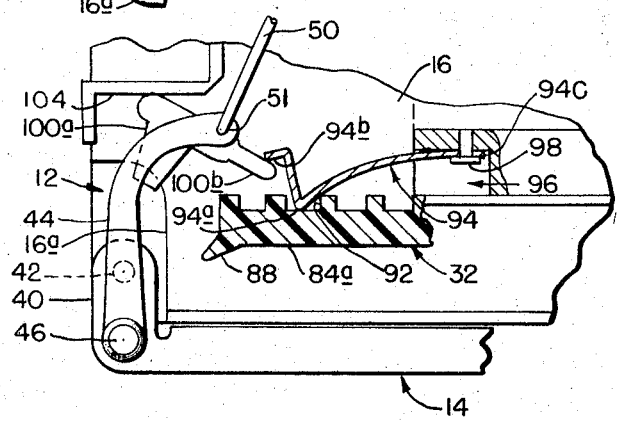

FIG. 11 is a diagrammatic, fragmentary top view of interlocking mechanism of the processing apparatus at open position of the film-receiving component illustrating the relation thereof to detent means controlling operation of film-transport means within the camera; and FIG. 12 is a view similar to that of FIG. 11 with the receiving chamber at the folded or carrying position, further illustrating the interlocking mechanism and detent means at this position.

Figure 1:
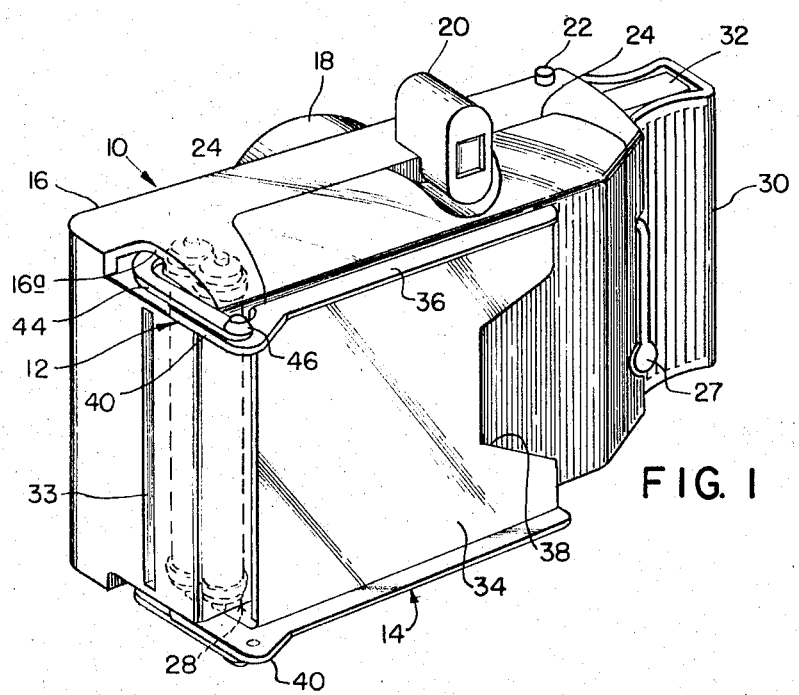
FIGURE 1 is a diagrammatic perspective view of a camera embodying the processing apparatus of the invention with the receiving chamber thereof at a folded or closed carrying position.

Referring now to FIGURE 1, a miniature camera 10 embodying the processing apparatus 12 of the invention is shown from the rear, with a semi-enclosed receiving chamber element 14 of the latter having been manually pivoted to its closed or carrying position. The camera includes a housing 16, a lens assembly 18, a finder 20, a shutter release 22, a magazine 24 containing a plurality of stacked film assemblies 26 (FIGS. 5, 6 and 7), the magazine release means 27, a pair of pressure rolls 28 between which each film assembly is advanced after its exposure for processing purposes, and a handle 30 for actuating propulsive means within the camera housing in the form of a transport mechanism 32 (FIGS. 3, 11 and 12) to thus advance each film assembly. The chamber 14, at open position, is adapted to receive and hold each film assembly as it is advanced from the pressure rolls 28 through an elongated aperture or slot 33 formed at an end of the camera housing adjacent to the pressure rolls 28. Light sealing means within the housing, such as a strip or pair of strips composed of a resilient material, e.g., of a soft rubber or the like, are adapted to cover the aperture when a film assembly is not located therein.

Figure 2:
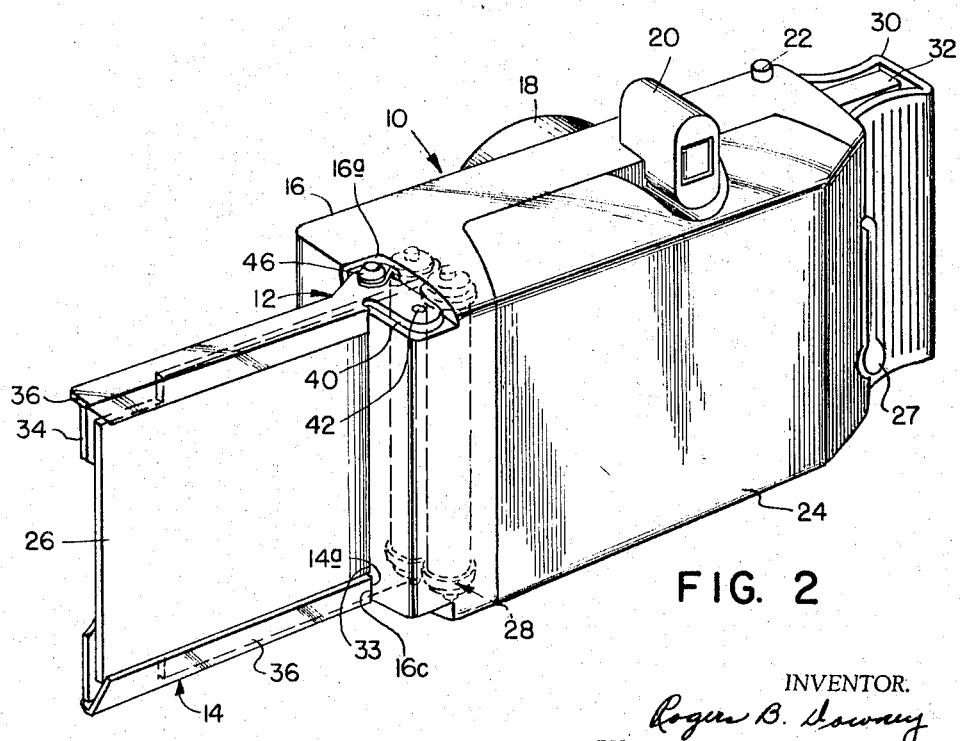
FIG. 2 is a diagrammatic perspective view of the camera with the processing apparatus of the invention with the receiving chamber thereof at an open or extended functional position.

In FIG. 2, the film-assembly receiving chamber 14 is illustrated at an open or functional position. The chamber 14, serving to complete the processing operation initiated by the pressure rolls, is formed of a rigid opaque material such as a metal. Its front member 34 is composed of a continuous, planar sheet of this material, terminating, at top and bottom, in rearwardly- and inwardly-extending overturned retaining flanges 36. A cut-out portion or access slot 38 is formed in the outer end of sheet 34. The inner or rear surface of the front member 34 is covered with a soft, resilient, light-absorbing material 35 such as a black velvet. After photographic exposure, advancement between the pressure rolls 28 and emergence from the slot 33, the open side of each film assembly through which the photographic exposure has been made is held firmly against this yielding surface by the flanges 36, thus preventing any entrance of actinic light to a photosensitive portion of the film assembly. Means for pivoting the chamber 14 to an open or closed position include a pair of mounting arms 40, integral with and extending angularly, e.g., substantially at 90°, from the flange portions 36. The arms 40 are mounted at pivot means 42 on the camera housing 16. The cut-away or recessed portions 16a of the camera housing, at top and bottom, permit positioning of the arms 40 therewithin, it being noted that the chamber 14 is of a width, taken vertically, which is similar to that of the camera in the same direction. Thus, top and bottom surfaces of both camera and chamber are essentially coplanar. The cut-away areas 16a are ample to permit unobstructed movement of the arms 40.

A positive establishment of the receiving chamber 14 at either the open or closed position is provided by a positioning mechanism composed of an obtusely-angled arm 44, pivotally connected at one end by the pin 46 to the upper mounting arm 40, at the outer bend of the latter, and a torsion spring 48. The torsion spring is mounted vertically in the camera housing, its lower extremity being fixed thereto. The upper extremity of spring 48 is provided with an integral laterally-extending lever 50 which is attached pivotally at 51 to the other end of arm 44.

Figure 8:
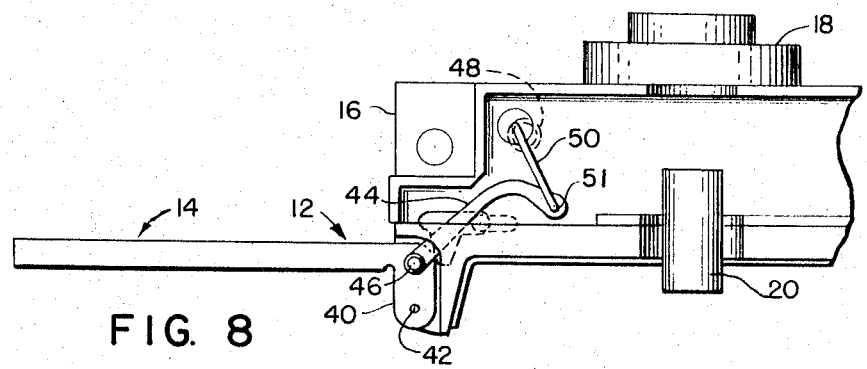
FIG. 8 is a diagrammatic top view of the processing apparatus, illustrating the operation of interlocking mechanism thereof at the extended open position of the film-receiving component.

At the open position of the receiving chamber 14, assuming it to have been manually opened, the spring 48, lever 50 and arm 44 coact both to assist in drawing the chamber to this position by urging arm 40 to rotate about pivot 42 in a clockwise direction and to hold it firmly when thus positioned, in cooperation with limit stop means provided by the inner edge 14a of the chamber in contact with an end surface of the camera housing at 16c. Operation of the several components at the open position of chamber 14 is illustrated in FIGS. 2 and 3 and, more specifically, in FIGS. 8 and 11, it being understood that the spring 48 has initially been so tensioned as to bias the lever 50 toward rotation in a counterclockwise direction.

Figure 9:
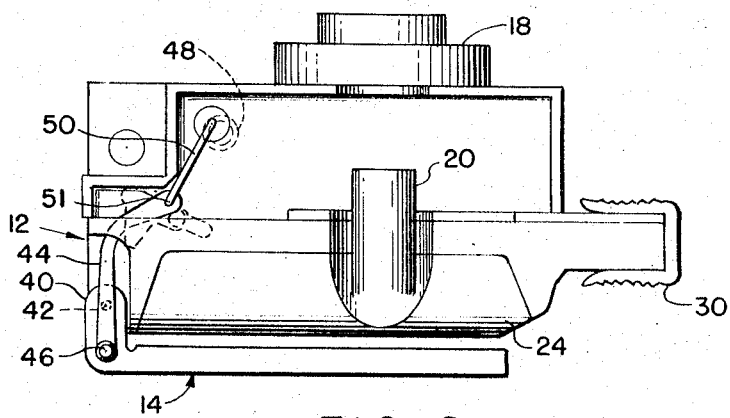
FIG. 9 is a diagrammatic top view of the processing apparatus illustrating the operation of interlocking mechanism thereof at the folded or carrying position of the film-receiving component.

When the receiving chamber 14 is moved toward the closed position, an over-center relation of the pivots 51 and 46 with respect to the pivot 42 is established. The counterclockwise bias applied to lever 50 acts to urge a counterclockwise rotation of the arm 40 about pivot 42, thus contributing to movement of the receiving chamber toward the back of the camera and into contact with the rear surface of the magazine 24. This condition is illustrated in FIG. 1 and in greater detail in FIGS. 9 and 12.

Wherein the terms "front" and "rear" or "forward" and "rearward" are employed herein, they refer to a relationship to the front or rear of the camera. Similarly, the terms "top" and "bottom," "upper" and "lower," "vertically" etc., relate to a location of elements, assuming the camera to be positioned as shown in FIGS. 1, 2 or 3.

Figure 5:
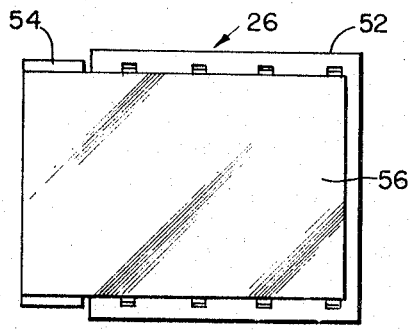
FIGS. 5 and 6 are diagrammatic rear and front views, respectively, of a film assembly adapted to use in conjunction with processing apparatus of the invention.
Figure 6:
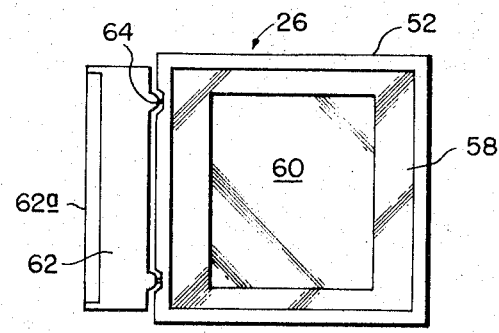

To fully comprehend the function of the apparatus of the present invention it is necessary to understand the structure of a film assembly of a type with which it is adapted to be employed. In FIG. 5, the film assembly 26 is shown from the rear, only portions of the rigid mount 52, end portions of a frangible container 54 releasably holding the processing liquid, and a cover sheet 56 being shown. The front of the film assembly is illustrated in FIG. 6. Included are the mount 52, seen from the side opposite to that of FIG. 5, a mask 58 defining the picture area, an image-providing component 60 including a photosensitive emulsion subject to photographic exposure and processing, and a so-called wedge-tab 62, tapered at 62a which is adapted to be first introduced between the pressure rolls 28 to effect their separation. The tab 62 is connected with the mount 52 by two frangible links 64. The liquid container 54 is attached to the tab at its opposite side. The mount 52, tab 62 and links 64 are suitably formed of a plastic, preferably in one piece by an injection moulding process as, for example, of a thermoplastic resin of the acetal family, an acrylic or a polystyrene.

The film assembly, adapted to a diffusion transfer method of image formation, is shown in more complete detail and with exaggerated dimensions of its components in FIG. 7. From front-to-rear it includes the aforesaid image-providing component 60, composed of a transparent base layer 66, an additive color-screen layer 68, a transparent image-receiving layer 70, and a photosensitive silver halide emulsion 72, e.g., a panchromatic emulsion. Following the latter, in order, are an opaque adhesion control or stripping sheet 74, adapted to adhere preferentially to the emulsion after completion of processing of the latter, and the cover sheet 56, already shown in FIG. 5. The layers 66 through 72 are bonded together to form as integral unit. Additionally shown are the container 54 of the processing liquid 76, attached to the wedge-tab 62, and an apron-like sheet 78 for controlling the flow of released liquid. Completing the structure are the mount 52, mask 58 and frangible links 64, previously described. When the film assembly, as shown in FIG. 7, is moved from left-to-right between the pressure rolls 28, the compressed liquid 76 is released between the separable edges 54a of the container. It then flows for a given distance between the apron 78 and cover sheet 56, forwardly through the space or channel 80 existing between the ends of the apron 78 and stripping sheet 74, and between the stripping sheet and emulsion 72, the liquid being spread completely throughout the emulsion. Upon solidification of the processing liquid, a firm adhesion exists between the stripping sheet and emulsion.

After leaving the pressure rolls 28, the complete film assembly passes through the aperture 33 into the receiving chamber 14, as shown fully and partially therewithin in FIGS. 2 and 3, respectively. It is held in the receiving chamber for the brief period necessary to complete the imbibition of the processing liquid and formation of the image, e.g., for approximately ten seconds for a film assembly of the type described. After the image is formed, the tab and exhausted liquid container adhering thereto are grasped between the thumb and forefinger, as permitted by the access slot 38 of the receiving chamber, and are bent rearwardly. The tab 62 is caused to break off at the frangible links 64. The portions connected therewith, directly or indirectly, including the container 54, the cover sheet 56, the apron 78 and the stripping sheet 74, are stripped away as a unit, the remainder of the film assembly being held firmly in the receiving chamber 14 by reason of the fact that the flanges 36 of the chamber grip the marginal portions of the mount 52, the portions stripped away lying intermediate of the flanges. Also stripped away is the emulsion 72, the stripping layer adhering thereto to a degree which is greater than the bond between the emulsion and the image-receiving layer 70. For more firmly holding the film assembly in the receiving chamber during the stripping operation, the trailing edge 52a of the mount is preferably held between the pressure rolls 28 until stripping is completed. After the above-stated brief period of remaining in the receiving chamber 14, the film assembly is manually removed, again using the recess 38 of the chamber for grasping the assembly. The surface of the image-receiving layer may, thereafter, be treated with a protective coating as necessary and the assembly is ready for direct viewing or projection.

The transport mechanism 32 for advancing each film assembly 26 from the exposure aperture 82 of the camera to the pressure rolls 28 and between the latter into the receiving chamber 14 is shown in FIG. 3. It consists, basically, of a rectangular frame-like element 84 slidably mounted in channel means 86 of the camera and having an angularly-disposed, tongue-like, propulsive element 88 at its leading edge for contacting the trailing portion 52a of the film-assembly mount. As previously stated, the transport mechanism is actuated manually by the handle 30. Maximum inward movement of the element 84 and tongue 88 is determined by contact of the handle surface 30a with the adjacent end of the camera housing. Maximum outward movement is controlled by limit stop means, not shown.

The film assemblies 26, in the form of a film pack, are mounted in the magazine 24. As indicated in FIG. 4, the foremost film assembly is that which is adapted to be exposed and slidably removed from the magazine, a succeeding film assembly taking its place for subsequent exposure upon its removal. Flange means 90 of the magazine guide the film assembly during its slidable lateral movement into the bite of the pressure rolls 28 and into the receiving chamber 14. When the magazine is mounted on the camera, as shown in FIGS. 1 and 2, the foremost film assembly is automatically positioned at the focal plane for exposure and is adapted to have its trailing edge engaged by the tongue 88, assuming the handle 30 to have been pulled outwardly to its extreme distance. After the photographic exposure, the handle is pushed inwardly to its maximum distance thus producing the above-described advancement of the film assembly between the pressure rolls and into the receiving chamber.

Figure 10:
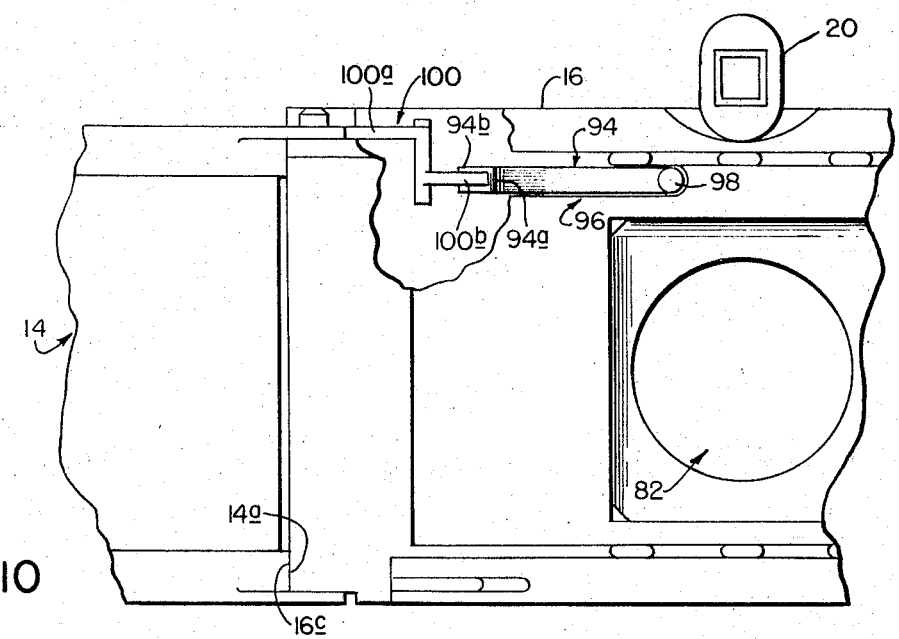
FIG. 10 is a diagrammatic, fragmentary rear view of the camera and processing apparatus, with parts broken away, further illustrating operation of interlocking mechanism thereof at open or functional position of the film-receiving component.

As will be apparent, it is highly important that no advancement of a film assembly from its location at the exposure aperture 82 shall take place unless the receiving chamber 14 is at its correct extended position, in readiness to receive it. Ejection of the film assembly through the slot 33 without the chamber in position would, of course, result in its becoming "light struck" because the open front of the film assembly must be completely shielded until the diffusion transfer process has been completed. A safety interlock mechanism identified with apparatus of the present invention, for automatically insuring that advancement of each film assembly can only occur when the chamber is thus disposed, is shown in FIGS. 10, 11 and 12. The front surface of the upper longitudinal member 84a of the frame-like transport element 84 is provided with a functional recess 92. A spring-like element 94 having an outwardly-protruding detent portion 94a, and an engageable angled extremity 94b, is located in a forwardly-indented recess 96 within the camera housing. The other extremity 94c of the element 94 is attached to the inner surface of the recess 96 by any suitable means such as the rivet 98. The elastic bias of the element 94 is such that, if not prevented, the protruding portion 94a would enter the recess 92 of the transport element at which position the transport element would be held or locked against any movement initiated by attempting to draw the handle 30 outwardly. It is to be understood that the recess 92 and detent portion 94a are aligned for entrance of the portion 94a at the maximum inward position of the transport element 84, as hereinbefore described.

A modified bell-crank element 100, having its arms extending in different planes, is pivotally mounted at 102. One arm 100a of the element is adapted to be contacted by the upper arm 40 of the receiving chamber 14 when the latter is brought to its open or extended position. When thus contacted, the bell-crank rotates in a counter-clockwise direction, as illustrated, and the second arm 100b thereof is caused to bear against and actuate forwardly the angled extremity 94b of the resilient element 94. Accordingly, the detent portion 94a of the latter is lifted from the recess 92 of the transport element 84 and the latter may be moved, by pulling handle 30 to its extreme outward position, so that a film assembly may be contacted at the exposure aperture 82 and focal plane by the tongue 88 and, thereafter, advanced, as described. When the receiving chamber 18 is moved to its closed position, the arm 40 is removed from contact with the bell-crank arm 100a and the bell-crank is caused to rotate in a clockwise direction as impelled by the elastic property of the spring-like element 94. The detent portion 94a is thus allowed to enter the recess 92 at which position it again prevents movement of the transport element 84. Limit stop means for determining clockwise rotation of the bell-crank is provided by flange 104 with which the bell-crank surface 100c comes in contact.

Again referring to FIG. 12, wherein the detent portion 94a is shown within the recess 92, a function in addition to that of prevention of the processing step is provided thereby. This is the locking of the handle 30 at its innermost position. When thus located, the handle, held inwardly, may be employed as a carrying means for the camera.

Another film structure, adapted to a subtractive method of forming the image in full color, comprises, in order of incidence of the light of a photographic exposure, a transparent base layer, a transparent image-receiving layer, a blue-sensitive silver halide emulsion layer, a layer containing a yellow coupler, a green-sensitive silver halide emulsion layer, a layer containing a magenta coupler, a red-sensitive silver halide emulsion layer, and a layer containing a cyan coupler. Assuming exposure to a multicolored subject and imbibition of the released processing liquid into at least the several emulsion layers, image-forming substances in substantially undeveloped areas of the photographically exposed blue-green-sensitive and red-sensitive emulsions are caused to diffuse to the image-receiving layer to provide, in the latter, registered color-separation images in yellow, magenta and cyan, respectively. The several layers and cover sheet, in bonded unitary relation, are stripped from the image-receiving layer, after completion of the processing step, leaving the latter layer, containing the multicolored image and integral with the transparent base layer, as a full-color transparency.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for incorporation with a camera for performing the steps of both completing the processing and providing the ultimate physical form of a multilayered photographic film assembly having one surface uncovered and a light-impervious covering on the opposite surface, said steps being performed after the film assembly has been photographically exposed and subjected to a preliminary processing treatment within said camera and ejected through an exit aperture thereof, said apparatus comprising a semi-enclosed film-assembly receiving and processing chamber mounted externally on the housing of said camera adjacent to said exit aperture, said chamber having one continuous, opaque side member with light-shielding surface means thereon and an opposite open side with flange-like guiding and holding means extending between said sides, said chamber being adapted to so receive said film assembly when it is ejected following its processing treatment that the uncovered surface of said film assembly is contiguous with said light-shielding surface means and held thereagainst by said flange-like means.

2. Apparatus, as defined in claim 1, wherein said flange-like means serve to retain given portions of said film assembly constituting said final physical form, while other portions, intermediate of said flange-like means, are not thus retained by said flange-like means and are adapted to be manually stripped away.

3. Apparatus, as defined in claim 1, wherein said chamber is pivotally mounted on said housing and adapted to be located, optionally, at an extended position for receiving said film assembly and at a position folded against said camera housing for carrying purposes.

4. Apparatus, as defined in claim 3, wherein interlock means are included for permitting said processing treatment and ejection of said film assembly only when said chamber is at said extended position.

5. Apparatus, as defined in claim 3, wherein are included means for holding said chamber at said extended and folded positions.

6. Apparatus, as defined in claim 2, wherein said opaque side of said chamber includes a cut-away portion for facilitating access to said film assembly to enable its removal, manually, from said chamber.

7. Apparatus for incorporation with a camera for effecting completion of the processing of a multilayered photographic film assembly after it has been photographically exposed and subjected to a first processing means within said camera followed by its ejection through an exit aperture formed in the housing of said camera, said apparatus comprising a film-assembly receiving chamber adjustably mounted externally of said housing adjacent to said exit aperture, means for holding said chamber, optionally, at an extended position for receiving said film assembly when ejected through said exit aperture and at a position folded against said housing for compactness when transporting said camera, and means interlocking a portion of said chamber and said first processing means for rendering said first processing means inoperative except when said chamber is located at said extended position.

8. Apparatus, as defined in claim 7, wherein said receiving chamber includes a closed opaque planar front member having a resilient rear surface for contacting a surface of said film assembly and a cutaway portion for manually grasping said film assembly, and wherein a pair of overturned flange members extend rearwardly from top and bottom extremities of said front member for engaging marginal portions of said film assembly, said receiving chamber having an open rear face intermediate of said flange members.

9. Apparatus, as defined in claim 7, wherein said receiving chamber is pivotally mounted on said camera housing by a pair of rearwardly-extending arm members integral with said flange members.

10. Apparatus, as defined in claim 9, wherein said interlocking means is a modified form of bell-crank, a first arm of which is subject to actuation by one of said rearwardly-extending arm members and a second arm of which is adapted to actuate detent means engageable with said first processing means so as to render the latter inoperative.

11. Apparatus, as defined in claim 10, wherein said first processing means includes a slidable element for transporting said film assembly, said slidable element having angled surface means adapted to be engaged by said detent means when said receiving chamber and said slidable element are at given locations so as to render said slidable element immovable.

12. Apparatus, as defined in claim 9, wherein said holding means includes an arm element pivotally attached at one end to one of said rearwardly-extending arm members and, at the other end, to lever means integral with one extremity of a torsion spring, the latter being fixed at its other extremity to said camera housing and so tensioned as to bias said lever means toward rotation, whereby said arm element is adapted to draw said receiving chamber toward fully-open and fully-closed positions, when so manually operated as to approach said positions.

13. Apparatus for incorporation with a camera for performing the steps of both completing the processing and providing the ultimate physical form of a multilayered photographic film assembly of a type having one surface uncovered for photographic exposure and a light-impervious covering on the opposite surface, said steps being performed after said film assembly has been photographically exposed and subjected to a first processing means within said camera followed by its ejection through an exit aperture thereof, said apparatus comprising a semi-enclosed film-assembly receiving and processing chamber pivotally mounted on an external surface of the housing of said camera adjacent to said exit aperture, said chamber having one continuous opaque side with a yielding light-shielding surface material thereon and an opposite open side, with flange means integral with said opaque side extending from two edges thereof for guiding and holding said film assembly, means for locating and holding said chamber, optionally, at an extended position for receiving said film assembly when ejected through said exit aperture and at a position folded against said camera housing for carrying purposes, and means interlocking said semi-enclosed chamber and said first processing means to prevent operation of said first processing means except when said chamber is located at said extended position.

14. In a camera including a housing, means for effecting a photographic exposure of a multilayered film assembly, and means for transporting said film assembly, after its exposure, between compressive processing means and through an exit aperture of said housing, apparatus complementing said transporting and compressive means for effecting the final processing and physical form of said film assembly, said apparatus comprising a film-assembly receiving chamber adjustably mounted externally of said housing adjacent to said exit aperture, means for holding said chamber, optionally, at an extended position for receiving said film assembly when ejected through said exit aperture, and at a position folded against said housing for compactness when transporting said camera, and means interlocking said chamber and said first processing means for rendering said first processing means inoperative except when said chamber is located at said extended position.

15. Apparatus for incorporation with a miniature camera for providing the final processing and ultimate physical form, as a completely mounted transparency, of a multilayered film assembly embodying a releasably-confined processing liquid adapted to a diffusion transfer method of image formation, said film assembly having been exposed and transported between compressive processing means and through an exit aperture of said camera by means thereof for the purpose, said apparatus complementing said means of the camera and comprising a film assembly receiving chamber adjustably mounted externally of said housing adjacent to said exit aperture, means for holding said chamber, optionally, at an extended position for receiving said film assembly when ejected through said exit aperture and at a position folded against said housing for compactness when transporting said camera, and means interlocking said chamber and said first processing means for rendering said first processing means inoperative except when said chamber is located at said extended position.

16. In a miniature camera including a housing, means for effecting a photographic exposure of a multilayered preliminarily-mounted film assembly embodying a releasably-confined processing liquid and adapted to a diffusion transfer method of image formation, and means for transporting said film assembly, after its exposure, between compressive processing means and through an exit aperture of said housing, apparatus complementing said transporting and compressive means for effecting the final processing and physical form of said film assembly to provide it as a completely mounted transparency suitable for direct viewing and projection, said apparatus comprising a film-assembly receiving chamber adjustably mounted externally of said housing adjacent to said exit aperture, means for holding said chamber, optionally, at an extended position for receiving said film assembly when ejected through said exit aperture and at a position folded against said housing for compactness when transporting said camera, and means interlocking said chamber and said first processing means for rendering said first processing means inoperative except when said chamber is located at said extended position.

References Cited
UNITED STATES PATENTS 2,073,640   3/1937   Lauritz _____ 95—23

FOREIGN PATENTS 921,927   3/1963   Great Britain.

NORTON ANSHER, *Primary Examiner.*

G. M. HOFFMAN, *Assistant Examiner.*